Feb. 10, 1925.

R. F. HAUGHEY

PIPE JOINT

Filed April 5, 1923

1,525,647

WITNESSES

INVENTOR

Patented Feb. 10, 1925.

1,525,647

UNITED STATES PATENT OFFICE.

RODGER F. HAUGHEY, OF CAMBRIDGE SPRINGS, PENNSYLVANIA.

PIPE JOINT.

Application filed April 5, 1923. Serial No. 630,062.

*To all whom it may concern:*

Be it known that I, RODGER F. HAUGHEY, a citizen of the United States, and a resident of Cambridge Springs, in the county of Crawford and State of Pennsylvania, have invented a new and useful Improvement in Pipe Joints, of which the following is a specification.

The invention relates to flange couplings for pipes, and while applicable to pipes that are cast or otherwise formed of metal or other materials, it is particularly useful in connection with worked steel tubing such as welded or seamless tubes.

The object is to provide a coupling which is strong and durable, which may be easily made when the pipes are in position, and which may be repaired or renewed if necessary, without removing or altering the pipes.

Figure 1:
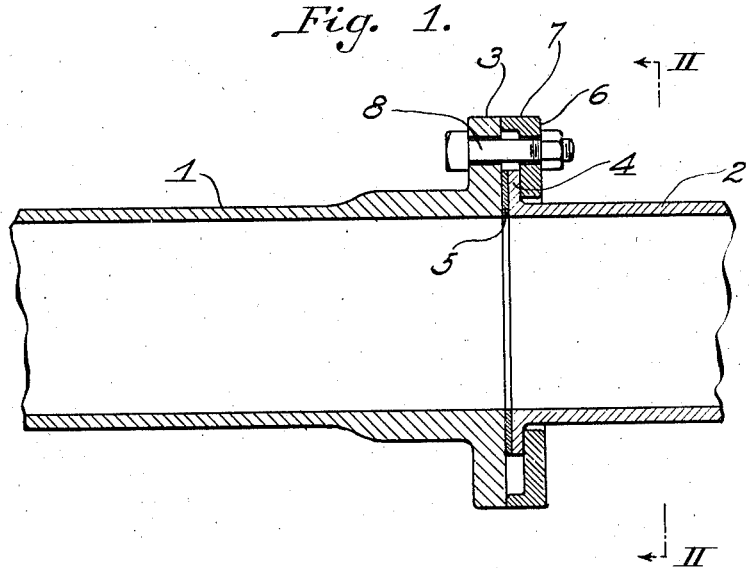
Figure 2:
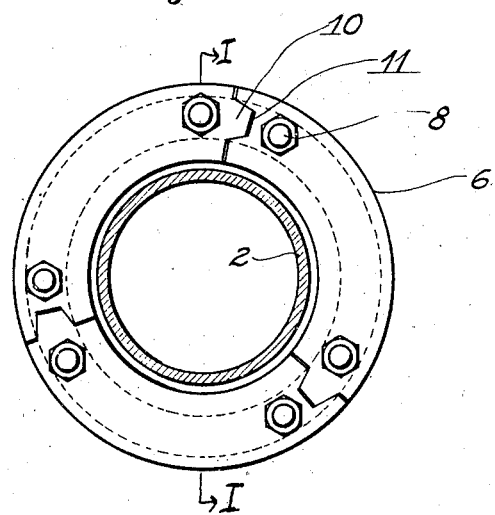

The invention is illustrated in the accompanying drawings of which Fig. 1 is a longitudinal and central sectional view through the ends of adjacent flanged pipes showing the coupling applied, the plane of view being indicated by the line I—I, Fig. 2; and Fig. 2 a transverse sectional view taken on the line II—II, Fig. 1.

According to the invention the adjacent ends of two pipes 1 and 2 are provided with flanges 3 and 4 at their extreme ends which abut against each other, a gasket ring 5 being arranged between the flanges, if desired. The flange 3 is materially wider than the flange 4 so that clamping bolts, which extend through its outer portion and engage a clamping ring, may clear the outer edge of the narrow pipe flange. The clamping ring is formed of segments 6, preferably not less than three in number, the outer edges of which are provided with flanges 7 which bear against the outer edge of the wide flange 3 of pipe 1. The inner edges of the segments bear against the outer faces of the narrow flange 4 of pipe 2, and clamping bolts 8 extend through the wide flange and engage the segments between their inner and outer bearing edges. The segments forming the clamping ring may, if desired, be provided with interlocking projections 9 and grooves 10, as indicated in Fig 2.

When the clamping bolts are tightened, their flanges 7 bear upon the outer edge of pipe flange 3, and their inner edges press against narrow flange 4. By increasing the number of segments beyond that indicated in the drawing, the effective points of direct bearing of the inner edge of the segments against the narrow pipe flange may be increased. Preferably, there are but two clamping bolts extending through each of the segments so as to assure the clamping action just explained.

As previously indicated, the invention is particularly applicable to worked steel tubing such as welded or seamless tubes. In forming the wide flange 3 on the end of such a tube, it is preferred to upset the end of the tube so that the thickness of the wide flange and the end of the tube adjacent to it is materially in excess of the normal wall thickness of the tube. This feature of the invention is clearly illustrated in Fig. 1. Ordinarily each tube will be provided at one end with a wide flange and the other with a narrow one, although alternate tubes may be provided with the same type of flanges at both ends.

The pipes may be readily clamped to each other after they are in position with the flange of one abutting against that of the other. Manifestly, each segment of the clamping ring may be separately clamped in its proper position and in case a segment should break, it may be replaced without removing the pipes.

I claim as my invention:

In a flange coupling for pipes, the combination with a pair of abutting pipes, one of which is provided with a wide and the other with a narrow flange, of a ring formed of not less than three segments bearing at its inner edge against the outer face of said narrow pipe flange and provided at its outer edge with a flange bearing against the outer edge of said wide pipe flange, and clamping bolts extending through said wide pipe flange and through only the ends of each segment between its inner bearing edge and its outer bearing flange.

In testimony whereof, I sign my name.

RODGER F. HAUGHEY.

Witness:
JENNIE E. KLINE.